US012674021B2

United States Patent

(12) United States Patent
Bakan et al.

(10) Patent No.: US 12,674,021 B2
(45) Date of Patent: Jul. 7, 2026

(54) ELASTOMERIC POLYMER MATERIAL WITH SHAPE MEMORY PROPERTIES AND METHOD FOR PREPARING SUCH A MATERIAL

(71) Applicants: Institut National de Recherche pour l'Agriculture, l'Alimentation et l'Environnement, Paris (FR); Centre National de la Recherche Scientifique, Paris (FR); Nantes Universite, Nantes (FR); Ecole Nationale Vétérinaire, Agroalimentaire et de l'Alimentation, Nantes (FR); Universite de Rennes, Rennes (FR)

(72) Inventors: Bénédicte Bakan, Nantes (FR); Didier Marion, Nantes (FR); Denis Lourdin, Sucé sur Erdre (FR); Mathilde Marc, Saint Germain en Coglès (FR); Christelle Lopez, Pacé (FR); Eric Leroy, Saint Etienne de Montluc (FR); Franck Artzner, Domloup (FR)

(73) Assignees: Institut National de Recherche pour l'Agriculture, l'Alimentation et l'Environnement, Paris (FR); Centre National de la Recherche Scientifique, Paris (FR); Nantes Universite, Nantes (FR); Ecole Nationale Vétérinaire, Agroalimentaire et de l'Alimentation, Nantes (FR); Universite de Rennes, Rennes (FR)

( * ) Notice: Subject to any disclaimer, the term of this patent is extended or adjusted under 35 U.S.C. 154(b) by 562 days.

(21) Appl. No.: 18/254,047

(22) PCT Filed: Nov. 22, 2021

(86) PCT No.: PCT/EP2021/082466

§ 371 (c)(1),
(2) Date: May 23, 2023

(87) PCT Pub. No.: WO2022/106679

PCT Pub. Date: May 27, 2022

(65) Prior Publication Data

US 2023/0406998 A1 Dec. 21, 2023

(30) Foreign Application Priority Data

Nov. 23, 2020 (FR) ...................................... 2012018

(51) Int. Cl.
*C08G 63/06* (2006.01)

(52) U.S. Cl.
CPC ......... *C08G 63/06* (2013.01); *C08G 2250/00* (2013.01)

(58) Field of Classification Search
None
See application file for complete search history.

(56) References Cited

U.S. PATENT DOCUMENTS

2022/0403101 A1 * 12/2022 Nemoto .................. C12P 7/625
2023/0406998 A1 * 12/2023 Bakan .................... C08G 63/06

FOREIGN PATENT DOCUMENTS

WO 2011144792 A1 11/2011

OTHER PUBLICATIONS

José J. Benítez et al., "Valorization of Tomato Processing by-Products: Fatty Acid Extraction and Production of Bio-Based Materials", Materials, vol. 11, No. 11, Nov. 7, 2018.
José Jesús Benítez et al., "Polyhydroxyester Films Obtained by Non-Catalyzed Melt-Polycondensation of Natural Occurring Fatty Polyhydroxyacids", Frontiers in Materials, vol. 2, Aug. 24, 2015.
International Search Report and Written Opinion mailed, Feb. 2, 2022, for PCT/EP2021/082466.

* cited by examiner

*Primary Examiner* — David J Buttner
(74) *Attorney, Agent, or Firm* — ArentFox Schiff LLP

(57) ABSTRACT

The invention relates to a method for preparing a polyester polymer material, which comprises preparing a reaction medium comprising a mixture of at least one monomer chosen from ω-hydroxylated fatty acids and ω-hydroxylated fatty acid esters of an alcohol comprising an aliphatic chain comprising from 1 to 18 carbon atoms, and at least one phenolic compound, the total content of phenolic compound (s) being within a range of values from 0.3 to 42 mg equivalent of gallic acid per gram of the mixture. The method then comprises heating this reaction medium in order to carry out the polymerisation of the monomer and the phenolic compound and the cross-linking of the polymer thus formed.

15 Claims, 6 Drawing Sheets

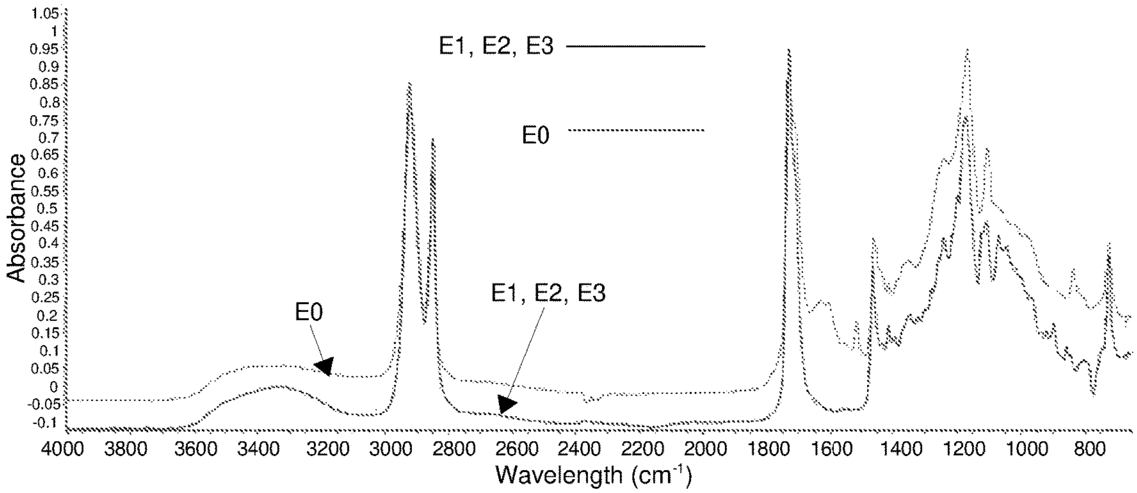
FIG 2
FIG 3
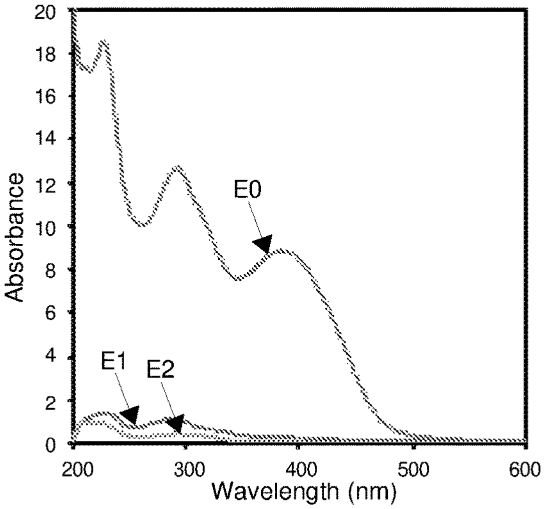
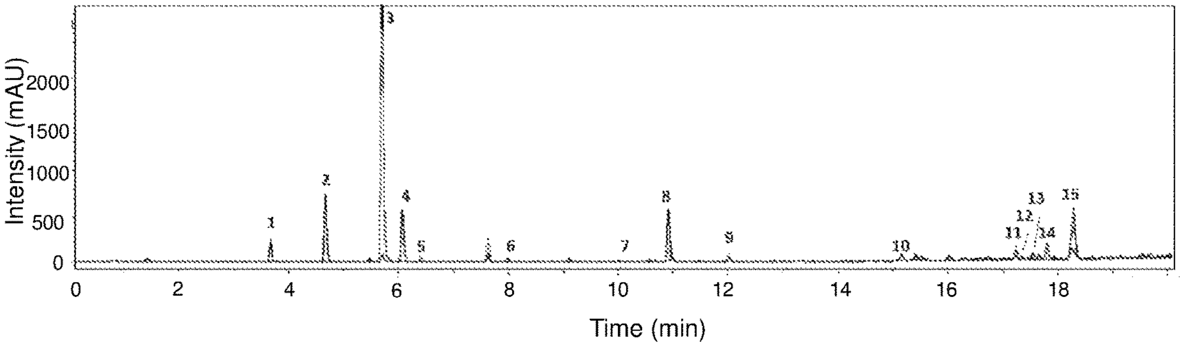
FIG 4

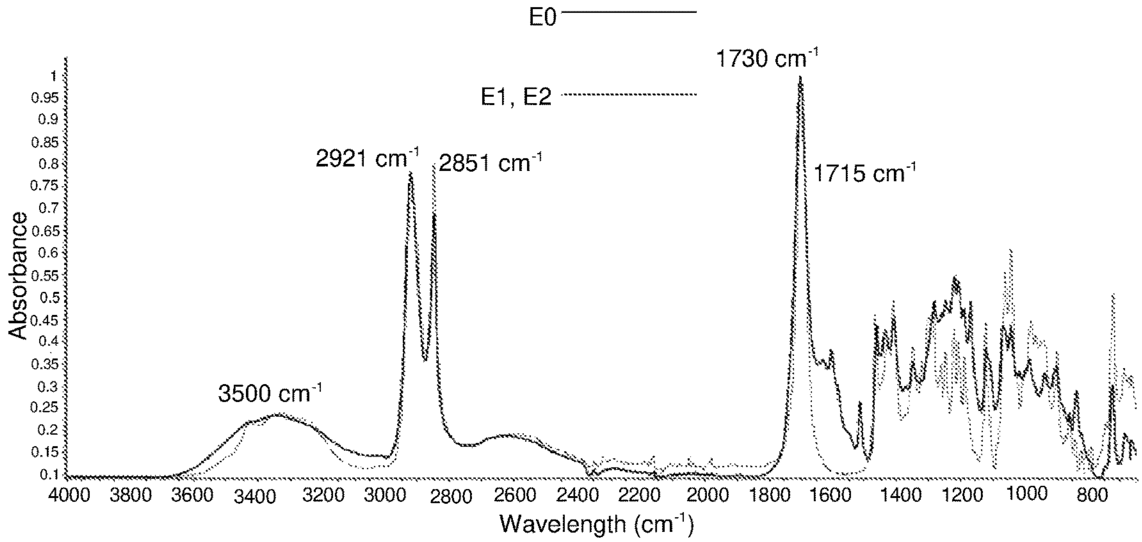
FIG 5
FIG 6
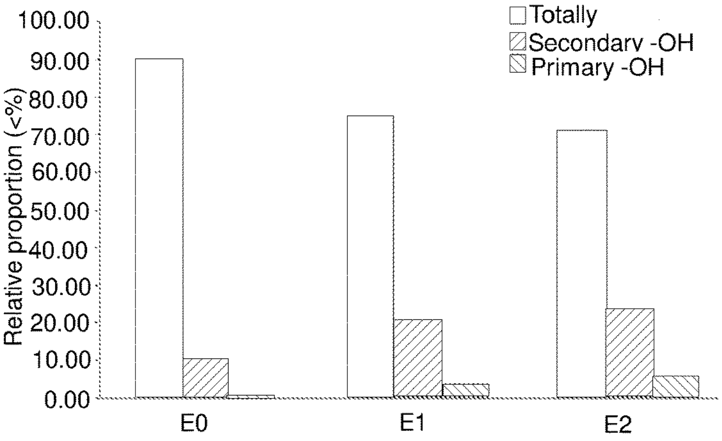
FIG 7
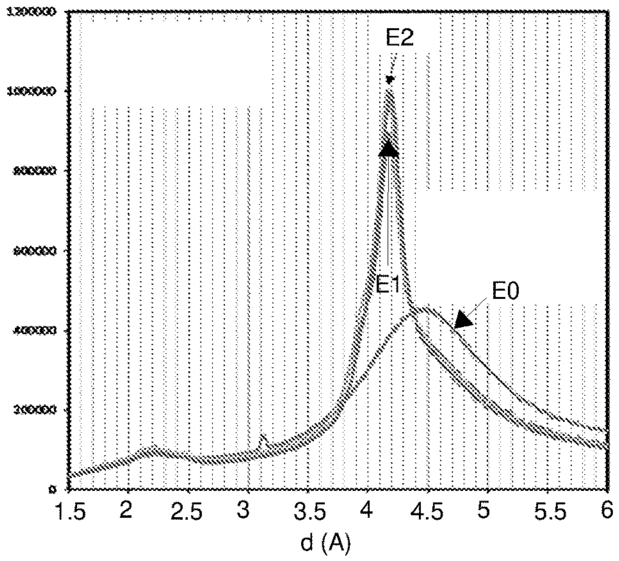

FIG 8
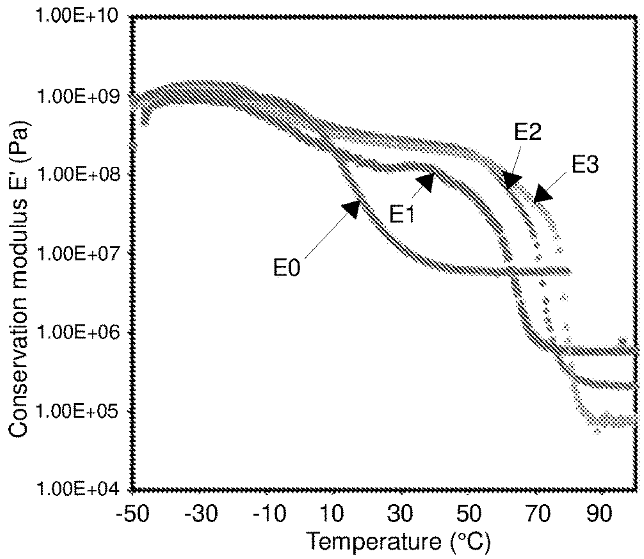
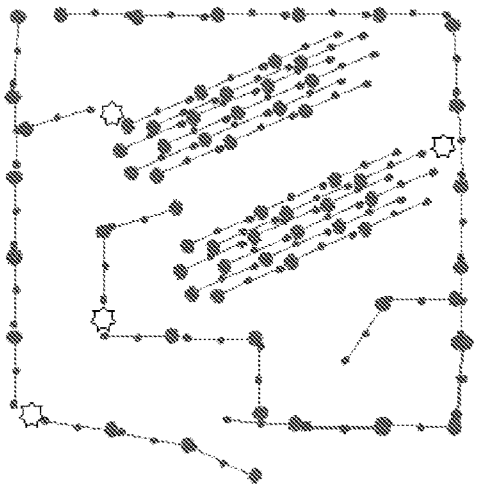
FIG 9
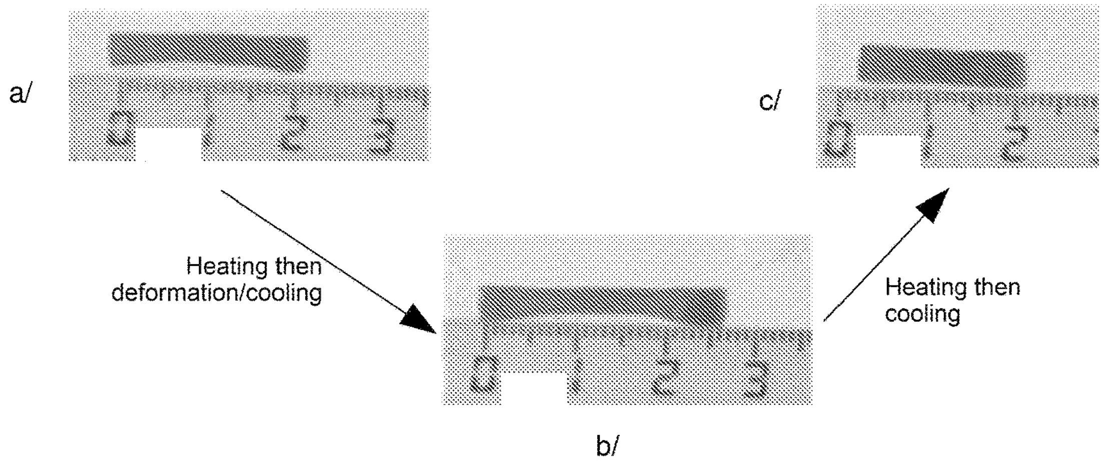
FIG 10

ELASTOMERIC POLYMER MATERIAL WITH SHAPE MEMORY PROPERTIES AND METHOD FOR PREPARING SUCH A MATERIAL

CROSS-REFERENCE TO RELATED APPLICATIONS

This application is a National Phase of PCT/EP2021/082466, filed on Nov. 22, 2021, which claims priority to FR Application No. FR2012018, filed on Nov. 23, 2020, the disclosures of which are hereby incorporated by reference in their entireties.

The present invention lies in the field of polymer materials, more specifically of the elastomer type, i.e., endowed with rubbery elasticity properties.

More particularly, the present invention relates to a method for preparing such an elastomeric polymer material, of the polyester type, which is furthermore endowed with shape memory properties, as well as a polymer material obtained by such a method, and the use thereof, in particular for manufacturing a medical device.

Polymer material with shape memory properties means, in the present description, in general terms, a material capable of changing shape under the effect of a stimulation, in particularly a thermal stimulation, this change in shape being reversible, also under the effect of an external stimulus such as a thermal stimulus.

Polymer materials with shape memory can thus take several shapes: a basic so-called permanent shape, and so-called temporary shapes, which are obtained by exposing the material to an external stimulus, generally to heat and/or to a stress. In particular, deformation of the material under the effect of a stress when at least one of the components thereof is in the rubbery or molten state, followed by cooling below its glass transition temperature or melting point, still under stress, makes it possible to obtain and fix a temporary shape of the material, by vitrification, or crystallization, of this component in the rubbery or molten state. Subsequent exposure to an external stimulus, also generally thermal, causes return of the material to its original permanent shape.

Such materials prove in particular to be very useful in numerous industrial fields, in particular for manufacturing medical devices.

The polymer materials with shape memory used at the present time are generally copolymers, the preparation of which requires numerous specific steps, lengthy to implement and consuming a great deal of organic solvents, which gives rise to a high manufacturing cost. These materials are furthermore generally obtained from raw materials coming from fossil resources.

The present invention aims to remedy the drawbacks of the methods for preparing polymer materials with shape memory proposed by the prior art, in particular the drawbacks set out above, by proposing such a method that makes it possible to obtain a polymer material with elastomeric properties and shape memory while using renewable raw materials, coming from biomass, biodegradable and non-toxic, thereby taking advantage of agricultural resources and minimizing the negative effect of such polymer materials on the environment.

A supplementary objective of the invention is that this method is simple and inexpensive to implement.

The invention also aims for this method to make it possible to easily modulate the shape recovery temperature of the polymer material, i.e., the temperature to which it must be subjected to regain its initial permanent shape from the temporary shape in which it has been shaped.

For this purpose, the present inventors have been particularly interested in compounds of vegetable origin consisting of fatty acids of the ω-hydroxylated type. These fatty acids, having a long carbon chain, are present in large quantities in nature. They can in particular be extracted from plants, in particular cuticles of fruits and legumes, and more particularly from the cutin forming part of these cuticles.

A ω-hydroxylated fatty acid is defined in the present description, in a manner that is conventional per se, as a fatty acid containing at least one hydroxyl OH group in the w position, i.e., carried by the last carbon atom in the chain of the fatty acid, the first carbon atom in the chain being the carbon atom of the carboxyl group of the molecule.

Furthermore, polyhydroxylated fatty acid means, also conventionally, a fatty acid comprising a plurality of hydroxyl groups, at least one of which is located in the w position. A dihydroxylated fatty acid thus comprises two hydroxyl groups, at least one of which is located in the w position, a trihydroxylated fatty acid comprises three hydroxyl groups, at least one of which is located in the w position, etc.

Methods for preparing polymers from ω-hydroxylated fatty acid have been proposed by the prior art. The document WO 2011/144792 describes a method for synthesizing a polyester from aleuritic acid. The publication by Benitez et al. in Materials, 2018, 11: 2211 describes a method for producing polyesters from monomers extracted from tomato cutin. The publication by Benitez et al. in Frontiers in Materials, 2015, 2(59): 1-10, describes a method for preparing polyhydroxyester films by polycondensation of natural polyhydroxy fatty acids. None of these methods makes it possible to obtain a polymer material with elastomeric properties and shape memory.

In previous work, described in particular in the international patent application PCT/EP2020/067548 published under the number WO 2020/260312, the present inventors used such ω-hydroxylated fatty acids, in particular in the form of extracts obtained by the depolymerization of cutin, for manufacturing polymers with elastic-deformation capability. They revealed the fact that these extracts, obtained by depolymerization of cutin, contain a certain quantity of phenolic compounds and carotenoids, this quantity being evaluated by gas chromatography coupled to mass spectrometry GC-MS/FID, and with respect to an external standard range specifically adapted to the quantification of the fatty acids contained in the extract analyzed, more precisely of heptadecanoic acid. The quantity of total phenolic compounds contained in these extracts, determined by this quantitative analysis method, was described therein only simply by way of indication, and in a greatly under-evaluated manner. The inventors have now determined, by implementing on these extracts a method for quantitative analysis of the total phenolic compounds that is the most quantitative and the least specific possible, namely a spectrophotometric analysis after reaction with the Folin-Ciocalteu reagent, the concentration being determined with respect to an external standard range of gallic acid, that the total content of phenolic compounds in these extracts was approximately 45 mg equivalent of gallic acid per gram of extract, which is equivalent to a total content of 4.5% by weight of phenolic compounds, with respect to the total weight of the extract.

The present inventors have now discovered that, entirely surprisingly, by reducing the content of total phenolic compounds in such an extract coming from cutin, in particular tomato cutin, to a specific lower range of values, the polymer material obtained by polymerization/cross-linking reaction from such an extract exhibits, apart from its elastomeric properties, shape memory properties, which make it particularly advantageous for a large number of applications.

Thus, according to a first aspect, the present invention relates to a method for preparing a polymer material of the polyester type, advantageously elastomeric, in the form of a thermoset three-dimensional lattice, and with shape memory, this method comprising successive steps of:

preparing a reaction medium comprising a mixture of:

at least one monomer selected from ω-hydroxylated, in particular polyhydroxylated, fatty acids, and the esters of a ω-hydroxylated, in particular polyhydroxylated, fatty acid, and of an alcohol having a linear or branched, saturated or unsaturated, optionally substituted, aliphatic chain, said aliphatic chain comprising from 1 to 18 carbon atoms;

and at least one phenolic compound, the total phenolic compound(s) content, determined by spectrophotometric analysis after reaction with the Folin-Ciocalteu reagent, with respect to a standard range of gallic acid, lying in a range of values from 0.3 to 42 mg equivalent of gallic acid per gram of said mixture, which is equivalent to 0.03 to 4.2% by weight with respect to the total weight of the mixture;

and heating this reaction medium to carry out the polymerization of the monomer and of the phenolic compound and the cross-linking of the polymer thus formed.

The method for quantitative analysis of the phenolic compound(s) present in a composition by spectrophotometric analysis after reaction with the Folin-Ciocalteu reagent, with respect to a standard range of gallic acid, is well known to a person skilled in the art, and is in particular described in the publication by Cabone et al., 2011, *Food Chem,* 127, 493-500. The Folin-Ciocalteu reagent, a mixture of phosphomolybdate and phosphotungstate, is in particular widely available commercially.

By way of example, this quantitative analysis method can be implemented by dissolving the composition containing the phenolic compound(s) to be analyzed, at a given concentration, for example 5 g/l, in a mixture of ethanol and water, in particular in respective proportions by volume of 70/30. After adding water, for example 1 ml, and then the Folin-Ciocalteu reagent, for example 1 ml, the reaction is left to occur for a few minutes, in particular 3 to 5 minutes. A solution of sodium carbonate and water, for example at a concentration of 10%, is next added, in particular in a quantity of 20 ml, and then the composition obtained is incubated at ambient temperature, away from light, for example for 1.5 hours. The absorbance of the composition is next read at 760 nm by means of a spectrophotometer, preferably against a blank. The content of total phenolic compound(s) in the initial composition is determined with respect to an external gallic acid calibration curve.

When the reaction medium according to the invention is prepared by mixing monomer(s) and pure phenolic compound(s), a person skilled in the art will in particular be able, for each given set of monomer(s) and phenolic compound(s), to determine by the above method the quantities by weight of phenolic compound(s) corresponding respectively to a content of 0.3 and a content of 42 mg equivalent of gallic acid per gram of the mixture, and to use any quantity by weight of phenolic compound(s) located between the two values thus obtained.

The method according to the invention, which is simple, rapid and inexpensive to implement, advantageously makes it possible to form, by an esterification reaction, and then cross-linking, a material of the thermoset polyester type, with elastomeric properties, biosourced, biodegradable and recyclable. This hydrophobic and semi-crystalline polymer material surprisingly has shape memory properties, which the polymer materials obtained from similar mixtures, but containing more, or less, phenolic compounds than the content recommended by the invention, do not exhibit. In particular, the use of a total content of phenolic compound(s) of less than 0.3 mg equivalent of gallic acid per gram of the mixture does not make it possible to form a material exhibiting shape memory properties, or even a cross-linked polyester material. The use of a total content of phenolic compound(s) greater than 42 mg equivalent of gallic acid per gram of the mixture also does not make it possible to obtain an elastomeric polymer material exhibiting shape memory properties.

Characteristics of the polymer material obtained according to the invention underlying its particularly advantageous properties will not be prejudged here. It can however be supposed that they are related to a particular crystalline structure of this polymer material, which would be obtained solely in the total content range of phenolic compound(s) recommended by the invention, and which would consist of an amorphous lattice containing stacks of crystalline phases of the hexagonal type, these crystalline phases being meltable at a temperature higher than ambient temperature. It has also been shown, by an analysis by differential scanning calorimetry (DSC), that these crystalline phases would be two in number, and would have close melting points.

The polymer material with shape memory obtained according to the invention is characterized in particular by a unique thermomechanical transition, advantageously allowing both hot programming thereof, at a temperature above the melting point of its crystalline phases, and "cold" programming thereof, i.e., it is possible to deform it and to give it a temporary shape at ambient temperature, typically between 18 and 25° C. Stimulation thereof by increasing the temperature above the melting point of its crystalline phases then makes it possible to trigger shape recovery.

The mechanical behavior of the polymer material obtained according to the invention, in respect of which it can be assumed that it underlies these properties, more precisely exhibits the following characteristics:

for temperatures below the melting point of its crystalline phases, the material has an elastoplastic behavior. More particularly, for deformations below about twenty percent, its behavior is of the elastic type. Indeed, it is observed that the stress increases linearly with the deformation until it reaches a flow threshold at 8 MPa for approximately 20% of uniaxial deformation. Beyond 20% deformation, the behavior of the material becomes plastic, a striction phenomenon is observed in uniaxial traction and the deformation becomes permanent, as long as the temperature remains below the melting point of the crystalline phases;

for temperatures above the melting point of the crystalline phases, the material has a hyperelastic behavior, with a rubbery elasticity typical of an elastomer. Deformed hot, the material can stretch by several hundred percent, and regains its initial shape when the stress is removed.

The thermomechanical transition between these 2 behaviors, i.e., elastoplastic when cold and hyperelastic when hot, is the key characteristic of the polymer material obtained according to the invention, which makes it possible to program and trigger its shape memory. Deformed plastically when hot or when cold to obtain a programmed temporary shape, and then heated, the polymer material obtained according to the invention regains its initial shape. In particular, to program this material, it is possible to deform it at a temperature below the melting point of its crystalline phases. It is then necessary to apply a stress higher than the stress at the flow threshold observed during uniaxial tensile tests, which is approximately 8 MPa. A plastic deformation can thus be obtained, the elongation having to be greater than 20% and being able to exceed 100%. This must of course be carried out without however reaching the deformation at failure of the material, lying between 200 and 400%.

Furthermore, the shape memory properties of the elastomeric polymer material formed by the method according to the invention are advantageously of the reversible character type, i.e., this material, after having been deformed from an initial shape A to a shape B, by heating under mechanical stress and then cooling under this same stress, can next change from this shape B to a shape A', closer to the initial shape A, when it is subjected to a specific temperature, referred to as the reversible shape recovery temperature, and, from this shape A', it spontaneously resumes the shape B when it is cooled below this reversible shape recovery temperature, without it having been necessary to apply a mechanical force to it. There again, without judging mechanisms underlying such a property, it may be thought that it could be related, at least in part, to the existence, in the polymer material, of two distinct crystalline forms, melting at close temperatures. For a given polymer material, the reversible shape recovery temperature can be determined experimentally, by DSC analysis, by producing thermograms after a heat treatment of the polymer material for 5 minutes at various heating temperatures, close to the melting points of the crystalline forms of the polymer material. The reversible shape recovery temperature then corresponds to the heating temperature for which the melting peaks of these two crystalline forms are best separated on the thermogram obtained, corresponding to the temperature at which only one of the two crystalline forms of the material is in the molten state.

To obtain this reversible character of the shape memory, the polymer material must initially be deformed, from the initial shape A to the shape B, at a temperature higher than its melting point (defined here as the temperature corresponding to the end of the last melting peak observed on the thermogram by analyzing the polymer material by DSC), and below the degradation temperature of the polymer material, and then cooled to ambient temperature while maintaining the mechanical stress. When the polymer material is subsequently taken to the reversible shape recovery temperature, without stress, it partially recovers the initial shape A (shape A'). Cooled once again, it recovers shape B, and so on.

The method according to the invention further makes it possible to easily modulate, in particular by acting on the total content of phenolic compound(s) in the mixture, and consequently on the quantity of phenolic compound(s) involved in the polymer lattice, both the irreversible shape recovery temperature and the reversible shape recovery temperature of the polymer material.

All these properties make the polymer material obtained according to the invention usable in a large number of fields and situations, by adapting its shape recovery temperature to the particular intended application.

In the present description, in a manner conventional per se, phenolic compound means a compound comprising a phenol unit. This definition encompasses acid-phenols, compounds comprising at least one carboxylic acid function and at least one phenolic hydroxyl function, the carboxylic acid function being or not located on the aromatic cycle carrying the phenolic hydroxyl function.

Preferentially, the monomer used according to the invention is selected from polyhydroxylated fatty acids and esters of a polyhydroxylated fatty acid and of an alcohol having a linear or branched, saturated or unsaturated, optionally substituted, aliphatic chain, said aliphatic chain comprising from 1 to 18 carbon atoms. It may in particular be used in the form of a composition containing a plurality of hydroxylated fatty acids and/or of esters of a hydroxylated fatty acid and of an alcohol having a linear or branched, saturated or unsaturated, optionally substituted, aliphatic chain, said aliphatic chain comprising from 1 to 18 carbon atoms, this composition containing at least 20% by weight of the monomer with respect to the total weight of the composition.

The method according to the invention may furthermore comply with one or more of the features described below, implemented alone or in each of the technically operative combinations thereof.

These features are in particular such that the reaction medium according to the invention, and the polymer material that it makes it possible to form, are preferably completely biosourced.

In particularly preferred embodiments of the invention, the reaction medium is free from catalyst, i.e., from reaction promoter/accelerator. The reaction medium is furthermore preferably free from solvent, and preferably also free from chain blocker.

The reaction medium according to the invention may contain one or more polyols, for example glycerol. It preferably has none of them.

Preferentially, it furthermore contains no degradation product(s) of phenolic compounds, resulting in particular from the degradation thereof by an oxidation reaction, in particular by treatment with hydrogen peroxide.

It also preferably contains no polysaccharides, monoglycerides and/or oligomers of hydroxylated fatty acids, the hydroxylated fatty acids that are present therein preferably being therein solely in the form of monomers.

The reaction medium may however contain substances other than the monomer(s) and the phenolic compound(s), for example other fatty acids and other aromatic compounds.

Preferentially, the reaction medium contains less than 10% by weight of compound(s) other than the phenolic compound(s) and the monomer(s) selected from ω-hydroxylated fatty acids and the esters of a ω-hydroxylated fatty acid and of an alcohol having a linear or branched, saturated or unsaturated, optionally substituted, aliphatic chain, including from 1 to 18 carbon atoms. Thus, the mixture of the phenolic compound(s) and of the monomer(s) preferably represents at least 90% by weight of the reaction medium.

The step of preparing the reaction medium of the method according to the invention is preferably implemented at a temperature higher than or equal to 50° C.

The heating step of the method according to the invention is for its part implemented under conditions making it possible to achieve the esterification of one or more hydroxyl groups of the phenolic compound(s) by the acid function of the monomer(s), and so as to allow cross-linking of the polymer to form a thermoset three-dimensional lattice. It falls within the competence of a person skilled in the art to determine the time and temperature conditions to apply to obtain such a thermoset three-dimensional lattice, according in particular to the particular monomer(s) used and the degree of cross-linking sought for the polymer material.

In particular embodiments of the invention, the heating step is implemented in a temperature range between 120 and 200° C., in particular at a temperature of approximately 150° C.

It is furthermore preferably implemented for a period of at least 4 hours, preferably between 4 and 60 hours and preferentially between 5 and 28 hours, for example between 22 and 28 hours.

In particular embodiments of the invention, at least an initial phase of the heating step is implemented under reduced pressure. By this it is meant that a reduced pressure is applied at least at the start of the heating step, in the first stages of this step.

In preferred embodiments of the invention, at least an initial phase of the heating step is implemented at a pressure between 0 and 900 mbar, and preferentially between 400 and 800 mbar. Applying a pressure in such ranges of values, during at least the initial phase of the heating step, makes it possible in particular to increase the speed of the polymerization reaction of the monomer.

Preferentially, the duration of the initial phase of the heating step, during which a reduced pressure is applied, is between 30 min and 5 hours, preferably between 1 hour and 3 hours, in particular of approximately 90 minutes.

The temperature applied during the initial phase of the heating step may be identical, or different, with respect to the temperature applied during the second phase of the heating step, which is defined as the phase taking place after the initial phase, until the end of the heating step.

The second phase of the heating step for its part may be implemented for a suitable period for obtaining the required degree of cross-linking for the polymer material formed. This duration is preferentially of at least 4 hours, and preferably between 4 and 48 hours, for example of approximately 24 hours.

No reagent or other substance is preferably added to the reaction medium before or during the second phase of the heating step.

In particular embodiments of the invention, the method according to the invention comprises, during the heating step, before the gel point of the polymer has been reached, a step of eliminating the bubbles present in the reaction medium. This step may be implemented by any means, for example by manual or automatic stirring of the reaction medium. It may be implemented continuously, for example throughout all the duration of the initial phase of the heating step, or be implemented at isolated times, on one or more occasions during the heating step, and in this case preferentially at least once just before, for example 1 to 5 minutes before, the gel point of the polymer has been reached. In a particular embodiment of the invention, the step of eliminating the bubbles present in the reaction medium comprises at least one phase of stirring the reaction medium just before the polymer present in the reaction medium has reached its gel point, for example when the longest reaction time for which the reaction medium remains completely soluble in the presence of the solvent in the solubility test described below is reached. The heating of the reaction medium can optionally be interrupted during an isolated phase of stirring the reaction medium aimed at eliminating therefrom the bubbles that have formed therein.

In a manner conventional per se, as with any method leading to the formation of a chemically cross-linked polymer lattice, the gel point is here defined as the moment when a solid three-dimensional lattice appears in the liquid reaction medium. The gel time corresponds to the interval of time between the start of the reaction and the moment when the gel point is reached in the reaction medium. The appearance of this solid lattice causes a divergence in the flow viscosity, which tends towards the infinite at the gel time. Moreover, this solid lattice is by nature insoluble in solvents. It is therefore possible to detect the appearance thereof, i.e., the occurrence of the gel point, by a solubility test in a solvent capable of solubilizing the components of the initial reaction medium.

It falls within the competence of the person skilled in the art to determine, for each set of specific operating conditions of the method according to the invention, the gel time necessary for arriving at this gel point. For this purpose, the person skilled in the art will in particular be able to proceed empirically, for example by tests of solubilization of the reaction medium after various reaction times, in a solvent capable of solubilizing the initial reaction medium. The gel time will then lie between the shortest reaction time leading to the observation of an insoluble fraction in the solvent used for the solubility test, and the longest reaction time for which the reaction medium remains completely soluble in the presence of this solvent. By way of example, after various reaction times, a sample of 10 mg of the reaction medium can thus be incorporated in 1 ml solvent, for example ethanol. After 5 minutes of vortexing, the possible appearance of an insoluble fraction is observed in the mixture, which testifies to the fact that the gel point has been reached, and the gel time exceeded. Such a solubility test can be implemented at very close intervals, for example every 10 seconds, in order to determine the gel time as precisely as possible. This solubility test can be implemented on a reference reaction medium, in particular of small volume, in order to determine the gel time of the polymer under operating conditions that will then be applied for the proper implementation of the method according to the invention.

All the steps of the method according to the invention are preferably implemented in a single receptacle, preferably in a mold having a suitable shape for the intended application of the polymer material obtained at the end of the method. All the phases of the heating step are furthermore preferably implemented by means of one and the same heating device.

The heating device in which the method according to the invention is implemented is conventional per se. It can in particular be an oven, which may have one or more temperature zones, equipped with means for establishing therein a reduced pressure, as well as, preferably, means for stirring a receptacle/mold placed inside it.

The method according to the invention may use equally well use a single phenolic compound or a plurality of such compounds.

Preferentially, the mixture of at least one monomer and at least one phenolic compound contains at least one phenolic compound selected from hydroxybenzoic acids, hydroxycinnamic acids and flavonoids, or any combination of such phenolic compounds.

This mixture preferably contains at least one, or at least two, at least three, at least four, at least five, at least six, at least seven, at least eight, at least nine, or all, of the following phenolic compounds, or derivatives thereof: 2-hydroxybenzoic acid, p-coumaric acid, cis-p-coumaric acid, ferulic acid, myricetin, naringenin, 2-methylcoumaric acid, quercetin rhamnoside, quercetin-deoxyhexose, deoxy-hexosyl-dihydrokaempferol.

In particularly advantageous embodiments of the invention, the mixture contains at least p-coumaric acid and/or naringenin.

The total phenolic compound(s) content, determined by spectrophotometric analysis after reaction with the Folin-Ciocalteu reagent, with respect to a standard range of gallic acid, preferably lies in a range of values from 0.3 to mg equivalent of gallic acid per gram of the mixture, which is equivalent to to 2.5% by weight with respect to the total weight of the mixture.

The method according to the invention can use a single monomer selected from ω-hydroxylated fatty acids and esters of a ω-hydroxylated fatty acid and of an alcohol having a linear or branched, saturated or unsaturated, optionally substituted, aliphatic chain, including from 1 to 18 carbon atoms, or a plurality of such monomers.

The ω-hydroxylated fatty acid used in the method according to the invention can be linear or branched, i.e., consist of a carboxylic acid with a linear or branched aliphatic chain carrying one or more hydroxyl functions, at least one of which is located in a terminal position of said chain. The ω-hydroxylated fatty acid used according to the invention can in particular comply with the general formula (I):

$$(HO)C_nH_{2n-m-2p}(OH)_mCOOH \quad (I)$$

wherein:

n is an integer between 7 and 21, preferably between 12 and 20, even preferably between 13 and 19, preferentially between 15 and 17, m is an integer greater than or equal to 0, preferably between 1 and 3, and preferentially equal to 1, p represents the number of unsaturations contained in said fatty acid and is an integer between 0 and 3, preferably equal to 0.

The ω-hydroxylated fatty acid esters that can be used according to the invention can in particular comply with the general formula (II):

$$(HO)C_nH_{2n-m-2p}(OH)_mCOOR \quad (II)$$

wherein:

n, m and p are as defined above, and R represents a linear or branched, saturated or unsaturated, optionally substituted, aliphatic chain, comprising 1 to 18 carbon atoms, preferably 1 to 6 carbon atoms, preferentially a methyl radical or an ethyl radical.

In the present description, aliphatic chain means a non-aromatic open carbon chain.

In particular embodiments of the invention, the monomer is a methyl or ethyl ester of a ω-hydroxylated, preferably polyhydroxylated, and in particular dehydroxylated, fatty acid.

Preferential characteristics of ω-hydroxylated fatty acids that can be used in the method according to the invention are disclosed in detail below. The same characteristics can be transposed identically to the esters of a ω-hydroxylated fatty acid and of an alcohol having a linear or branched, saturated or unsaturated, optionally substituted, aliphatic chain, comprising from 1 to 18 carbon atoms.

Preferentially, at least one monomer used in the method according to the invention is a polyhydroxylated fatty acid, preferably a dihydroxylated fatty acid, i.e., the carbon chain of which carries two hydroxyl groups, one of which is located at the chain end. The ω-hydroxylated fatty acid furthermore preferentially carries a single acid function.

Thus, in particular embodiments of the invention, a monomer used is a dihydroxylated fatty acid, preferably with a single acid function.

Examples of ω-hydroxylated fatty acids that can be used as a monomer in the method according to the invention are, non-limitatively, 16-hydroxyhexadecanoic acid, 10,16-dihydroxyhexadecanoic acid, 16-hydroxy-10-oxo-hexadecanoic acid, 10-hydroxyhexadecanedioic acid, 18-hydroxyoctadec-9-enoic acid, 18-hydroxy-9,10-epoxyoctadecanoic acid or 9, 10, 18-tri hydroxyoctadecanoic acid. The mixture used according to the invention preferably contains, as a monomer, at least one 10,16-dihydroxyhexadecanoic acid, having the following formula (I'):

(I')

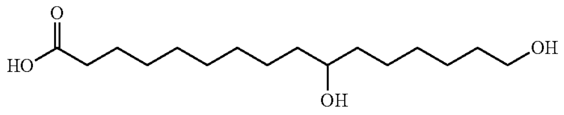

Esters particularly adapted to be implemented in the method according to the invention are the methyl and ethyl esters of 10,16-dihydroxyhexadecanoic acid. The ω-hydroxylated fatty acid(s) used as monomer(s) in the method according to the invention, as well as the phenolic compound(s), can be synthesized chemically.

All can otherwise be extracted from plants, more particularly from plant cuticles, and even more precisely from cutin, by depolymerization of the cutin by enzymatic method or by acid or basic hydrolysis, and separation, from the depolymerization medium, of the monomers extract resulting from the depolymerization.

Cutin is a polymer lattice of polyhydroxylated fatty acids, mainly C16 and C18, cross-linked by ester bonds, which is involved in the impermeabilization of leaves and fruits of higher plants. It is the main component of the cuticle of the plant, the extracellular continuous lipidic membrane that covers the above-ground parts of leaves and fruits of the plants.

In particularly preferred embodiments, the invention advantageously benefits from the fact that the extracts of monomers resulting from the depolymerization of cutin, containing mainly at least one ω-hydroxylated fatty acid, also contain phenolic compounds, in a quantity greater than the content recommended by the invention in the mixture of at least one monomer and at least one phenolic compound.

Thus, in preferred embodiments of the invention, the mixture of monomer(s) and of phenolic compound(s) used in the method according to the invention is obtained by depolymerization of cutin, recovery of the monomers extract obtained, i.e., separation of this extract from the depolymerization medium, and purification of this extract to partially eliminate therefrom the phenolic compounds that are contained therein, so as to obtain a phenolic compound(s) content lying in the range of values recommended by the present invention.

The cutin from which the monomers extract according to the invention is obtained is preferably tomato cutin.

More generally, preferentially, the ω-hydroxylated fatty acid(s) used as monomers in the method according to the invention, and/or the phenolic compound(s), are extracted from tomato, which has the advantage of high homogeneity of constitution of the cutin from one species to another, this cutin furthermore having a constituent monomer in a large majority quantity: 10,16-dihydroxyhexadecanoic acid, which is present therein at more than 80% by weight.

The tomato transformation waste, referred to as tomato draff, contains a large amount of cutin, more precisely 60 to 70%. The quantity of tomato draff produced each year in the world is estimated at 4 to 5 million tons. Thus, the method according to the invention makes it advantageously possible to process the agricultural and industrial waste that tomato draff constitutes, which proves to be of great advantage from both the environmental and the economic points of view. Otherwise, the mixture used in the method according to the invention, or one or more of the constituents thereof, can be obtained from other plants, such as apple (*Malus pumila*), bitter orange (*Citrus aurantium*), broad beans (*Vicia faba*), wild cherry (*Prunus avium*), cranberry (*Vaccinium macrocarpon*), grape (*Vitis vinifera*), pea seeds (*Pisum sativum*), gooseberries (*Ribes grossularia*), *papaya* (*Malabar papaiarnarum*), agave leaves (*Agave americana*), grapefruit seeds (*Citrus paradisi*), lemon (*Citrus limon*), lime (*Citrus aurantifolia*), *papaya* fruit (*Carica papaya*), onion (*Allium cepa*), blueberries (*Vaccinium vitis idaea*), coffee-tree leaves (*Rubiaceae coffea*), wild-rose fruit (*Rosa canina*), squash (*Cucurbita pepo*), etc., the extract from these plants then being subjected to purification to eliminate therefrom part of the phenolic compounds, so as to obtain the range of values recommended by the present invention for the phenolic compounds content.

Any method for extracting the cutin from the plants, in particular fragmentation of the tomato draff or of the tomato skins, and any method for polymerizing this cutin, so as to obtain a mixture of the ω-hydroxylated fatty acid(s) used as monomer(s) according to the invention and of the phenolic compound(s), can be implemented according to the invention. Schematically, these methods comprise the fragmentation of the tomato draff, or other plant elements, such as apple, to extract the cutin therefrom, and then the hydrolysis of the cutin to obtain therefrom the constituent monomers. After isolation, by these physical separation methods or by liquid-liquid extraction, the cutin is thus chemically hydrolyzed, in particular by alkaline method in an organic medium, or using specific enzymes, in particular cutinases.

The recovery of the extract of monomers obtained by depolymerization of the cutin, i.e., the separation of this extract from the depolymerization medium, can be implemented in any manner known to the person skilled in the art, for example by filtration, then precipitation in an acid or basic medium, and separation by filtration, centrifugation, etc.

In particular embodiments of the invention, the extract resulting from the depolymerization of cutin, recovered by separation thereof from the depolymerization medium, preferably contains at least 20%, preferably at least 80%, by weight of the monomer with respect to the total weight of the extract. An example of a method that can be used for the formation and recovery of an monomers extract resulting from the depolymerization of cutin is described in the document WO 2015/028299. This method comprises, schematically, the heat treatment of tomato skins, then introduction of same into an alkaline solution, for example potassium hydroxide at a concentration of between 0.5 M and 6 M, at a temperature of between 20° C. and 130° C., for example between and 130° C. The solution can then for example be filtered, then acidified, in particular with hydrochloric acid at a concentration of between 12 M and 6 M. After centrifugation, for example at 10,000 to 14,000 rpm for 15 to 20 minutes, the residue is washed, for example with demineralized water, then optionally dried.

A preferred method according to the invention consists, after a step of decanting tomato draff to recover the skins, and the drying, grinding and delipidation of the skins thus recovered, in hydrolyzing them in an alkaline medium in an alcohol solvent. By way of an example, such hydrolysis can be implemented by immersing the delipidated and dehydrated skins in alcoholic potash (for example formed by 5% potash in anhydrous ethanol), at 50° C., for 6 hours to 5 days, preferably for 2 days. The mixture can next be filtered under vacuum, and the ethanol eliminated by means of a rotary evaporator. The fatty acids contained in the composition obtained can be precipitated, in particular in water at a pH of between 2 and 3, for example in a 37% hydrochloric acid solution, then recovered, in particular by centrifugation, for example at 9000 rpm for minutes. After rinsing(s) of the pellet obtained with demineralized water and lyophilization, an oily composition is obtained with a yield of between 60 and 70%, containing essentially fatty acids, including as a great majority 10,16-dihydroxyhexadecanoic acid. More precisely, this oily composition obtained at the end of the operations of depolymerizing the cutin contains at least 85% by weight fatty acids. The 10,16-dihydroxyhexadecanoic acid preferably represents therein at least 88% by weight these fatty acids. It also contains phenolic compounds, in particular p-coumaric acid and naringenin in majority quantities, the total phenolic compounds content, measured by the method recommended by the invention, being approximately 45 mg equivalent of gallic acid per gram of composition.

The polyhydroxylated fatty acid ester that can be used according to the invention can for its part be prepared by esterification of the corresponding fatty acid by any method conventional per se for the person skilled in the art, without catalysis or preferably with acid catalysis. It can otherwise be obtained by transesterification of the polyhydroxylated fatty acids contained in the plant cutins, preferably implemented in acid catalysis or in basic catalysis, using a strong base or alcoholates such as sodium methanolate or sodium ethanolate. The alcohol used for implementing the esterification or transesterification reaction of the fatty acid preferably includes 1 to 18 carbon atoms and preferentially 1 to 8 carbon atoms. It is preferably selected from methanol, ethanol, propanol, butanol, pentanol, hexanol and its isomers, including 2-ethyl-butanol, heptanol and its isomers such as 2-heptanol, octanol and its isomers such as 2-ethylhexanol, and also isopropanol, 2-methyl-propanol, 2-methyl-propan-2-ol, butan-2-ol, amylic alcohols, 2-methyl-butanol, 3-methyl-butanol, 2,2-dimethyl propanol, pentan-3-ol, pentan-2-ol, 3-methylbutan-2-ol, 2-methylbutan-2-ol, guerbet alcohols such as 2-propyl-heptanol, 2-butyl octanol. By way of example, a polyhydroxylated fatty acid ester that can be used in the method according to the invention can be produced directly from tomato skins, by contacting the skins with alcohol, in particular methanol or ethanol, in the presence of an acid, for example 2 to 5% concentrated sulfuric acid, at a temperature of between 50 and 70° C. for at least 6 hours. The fatty acid esters obtained at the end of the transesterification reaction can be recovered by the addition of water to the reaction medium and then centrifugation. There again, the extract thus recovered contains them in a mixture with phenolic compounds, the latter being present in a total content greater than that recommended by the invention. The phenolic compound(s) content recommended by the invention is then obtained by a step of purifying the fatty acid esters carried out so as to partially eliminate the phenolic compounds present.

In particular embodiments of the invention, the mixture of the monomer(s), whether these be in the form of acids or esters, and of the phenolic compound(s), thus consists in an extract resulting from the depolymerization of cutin, preferably tomato cutin, after purification of the hydroxylated fatty acids contained in this extract to partially eliminate therefrom the phenolic compounds, until the content recommended by the invention is reached. This extract, which is preferentially rich in dihydroxylated fatty acids, preferably contains at least 20%, preferably at least 80%, by weight of the monomer with respect to the total weight of hydroxylated fatty acids contained in the composition. The monomer may be present therein in acid form or in ester form, according to the operating method that was used for implementing the depolymerization of the cutin.

Preferentially, the reaction medium according to the invention consists of such an extract after purification thereof.

The step of purifying the monomers extract recovered after depolymerization of cutin, in particular of tomato cutin, can be implemented by any method conventional per se for the person skilled in the art, in particular by chromatography, for example by silica column chromatography, or centrifugal partition chromatography.

By way of example, the extract can be purified by chromatography on a silica column of the amino-propyl type. The elution can for example be carried out with a mixture of chloroform and isopropanol, and then a mixture of chloroform and acetic acid.

For example, the purification step can be implemented by solubilizing the fatty acids extract in a mixture of chloroform and isopropanol (2:1 v:v) and by depositing it on an aminated silica column conditioned in this mixture of solvents, for example at the rate of 8 g of extract for 100 g of silica. After a first elution by this same mixture of solvents, between 5 and 10 volumes of column, the fatty acids are eluted by a mixture of chloroform and glacial acetic acid (98:2 v:v, 10 to 15 volumes of column). After evaporation of the solvents under vacuum, the purified extract is obtained.

To optimize the purification, a variant of this technique can use first of all a non-grafted, i.e., non-aminated, silica column, with an elution by a mixture of chloroform and methanol (93:7 v:v). After evaporation of the solvents, the partially purified extract obtained is subjected to a new step of purification on an aminated silica column according to the protocol described above. This purification in two chromatography steps makes it possible to obtain extracts the degree of purification of which is higher.

The method according to the invention may comprise a prior pre-purification step, for example by passing the extract of monomers over a filtrating mass of kaolin. Such a prior step, in particular implemented upstream of a step of purification by aminated silica column chromatography, advantageously makes it in particular possible to reduce the total cost of the purification.

According to a second aspect, the invention relates to a hydrophobic polyester polymer material, obtainable by a method according to the invention. This polymer material advantageously has elastomeric properties and shape-memory properties.

It comprises, as constituent monomer units, at least one ω-hydroxylated fatty acid and at least one phenolic compound. It furthermore has a semicrystalline structure comprising stacks of crystalline phases of the hexagonal type. It contains a quantity of 0.03 to 4.2% by weight of phenolic compound(s) units, with respect to the total weight of said polymer material, this quantity being determined by quantitative analysis of the total content of phenolic compound(s) in the mixture used for preparing the polymer material, by spectrophotometric analysis after reaction with the Folin-Ciocalteu reagent, with respect to a standard range of gallic acid, this content lying in a range of values from 0.3 to 42 mg equivalent of gallic acid per gram of mixture.

The polymer material according to the invention preferably comes from recycled raw materials, in particular cutin, in particular tomato cutin, and is preferentially in itself recyclable.

A monomer unit of this polymer material is preferably a polyhydroxylated, in particular dihydroxylated, fatty acid, for example 10,16-dihydroxyhexadeconoic acid.

A phenolic compound forming part of it is preferably p-coumaric acid and/or naringenin.

This polymer material may meet one or more of the features described above with reference to the method for preparing a polymer material according to the invention, with regard to everything relating to the polymer material in itself.

In particular embodiments of the invention, the polymer material is such that the melting point of its crystalline phases, corresponding substantially to the shape recovery temperature of the polymer material, is above 30° C., preferably between 30 and 70° C., example between 40 and 60° C.

A recovery temperature of 37° C. proves to be particularly advantageous for an application of the polymer material for manufacturing medical devices intended to be implanted in the body of a human individual.

The polymer material according to the invention has an elastoplastic character at temperatures below the melting point of its crystalline phases, and a hyperelastic character at temperatures higher than this melting point. The elastoplastic character preferably has a threshold of plasticity for a deformation of approximately 20% uniaxial deformation and a stress at the flow threshold of 8 MPa.

The material according to the invention can have a degree of crystallinity of between 20 and 50%.

An example of a chemical structure of such a polymer material, corresponding to the case where it consists of 10,16-dihydroxyhexadeconoic acid and p-coumaric acid constituent monomer units, is shown on FIG. 1.

The elasticity and shape-memory properties of the polymer material according to the invention can be taken advantage of for manufacturing various products, for applications in sectors as varied as the medical sector, the automobile sector, the aeronautical sector, etc.

Thus, another aspect of the invention relates to the use of a polymer material according to the invention for manufacturing a medical device, in particular: a device of the implantable type, such as a device for tissue engineering, suturing, a vascular endoprosthesis, etc., in particular when the polymer material has a shape recovery temperature of approximately 37° C.; or an external device, such as a dressing, a compressive orthosis, an anti-bedsore shape-memory mattress, etc.

The polymer material according to the invention can also advantageously be used for manufacturing:

a coating of a plant-protection product, or more generally a galenic formulation allowing a controlled diffusion of active molecules, for example intended for the biocontrol and/or the biostimulation of plants, a packaging article, in particular for cosmetic products, or sporting equipment in which it is desirable for certain components to be able to be tailor-made.

The polymer material according to the invention, through the reversible character of its shape-memory property, can also be used for manufacturing an actuator, in any industrial field, for example of a temperature sensor.

The features and advantages of the invention will emerge more clearly in the light of the examples of implementation below, provided simply by way of illustration and in no way limitative of the invention, with the support of FIGS. 1 to 15, wherein:

FIG. 1 shows the chemical structure of a polymer material according to the invention, consisting of 10,16-dihydroxyhexadeconoic acid and p-coumaric acid monomer units.

FIG. 2 shows the spectra obtained by infrared spectroscopy for, respectively, a fatty acid extract obtained from tomato cutin before purification (E0) and after purification aimed at partially eliminating from it the phenolic compounds (extracts comprising a phenolic compounds content according to the invention E1 and E2, and extract with a phenolic compounds content lower than the content recommended by the invention E3).

FIG. 3 shows the spectra obtained by UV-visible spectroscopy for, respectively, a fatty acid extract obtained from tomato cutin before purification (E0) and after purification aimed at partially eliminating from it the phenolic compounds (extracts comprising a phenolic compounds content according to the invention E1 and E2).

FIG. 4 shows the spectra obtained by analysis by liquid-phase chromatography coupled with tandem mass spectroscopy (LC-MS-MS) of, respectively, a fatty acid extract obtained from tomato cutin before purification (E0) and after purification aimed at partially eliminating from it the phenolic compounds (extract comprising a phenolic compounds content according to the invention E1).

FIG. 5 shows the spectra obtained by infrared spectroscopy for polymer materials obtained from, respectively, a fatty acid extract obtained from tomato cutin before purification, and after purification aimed at partially eliminating from it the phenolic compounds (extracts comprising a phenolic compounds content according to the invention).

FIG. 6 shows a bar graph showing, for polymer materials obtained from, respectively, a fatty acid extract obtained from tomato cutin before purification (E0) and after purification aimed at partially eliminating from it the phenolic compounds (extracts comprising a phenolic compounds content according to the invention E1 and E2), the relative proportions of the fragments coming from the acid totally esterified ("Totally"), esterified on the primary hydroxyl function only ("Primary—OH") and esterified on the secondary hydroxyl function only ("Secondary —OH").

FIG. 7 shows the diffractograms obtained by X-ray crystallography for polymer materials obtained from, respectively, a fatty acid extract obtained from tomato cutin before purification (E0) and after purification aimed at partially eliminating from it the phenolic compounds (extracts comprising a phenolic compounds content according to the invention E1 and E2).

FIG. 8 shows a graph showing the conservation modulus E', measured by dynamic mechanical analysis, as a function of the temperature, for polymer materials obtained from respectively a fatty acid extract obtained from tomato cutin before purification (E0) and after purification aimed at partially eliminating from it the phenolic compounds (extracts comprising a phenolic compounds content according to the invention E1 and E2, and extract with a phenolic compound contents lower than the content recommended by the invention E3).

FIG. 9 shows a schematic structural representation of a polymer material according to the invention. In this diagram, the large solid dots represent w-hydroxylated fatty acid monomer units, the small solid dots represent hydroxyl groups, the empty stars represent phenolic compounds units, in the form of monomers or dimers or trimers.

FIG. 10 shows photographs of a sample of polymer material according to the invention, in a/in its permanent initial form, in b/in its temporary form after heating above the melting point of its crystalline phases, uniaxial deformation and cooling, and in c/once again in its permanent form after heating above the melting point of its crystalline phases and cooling without stress.

Figure 1:
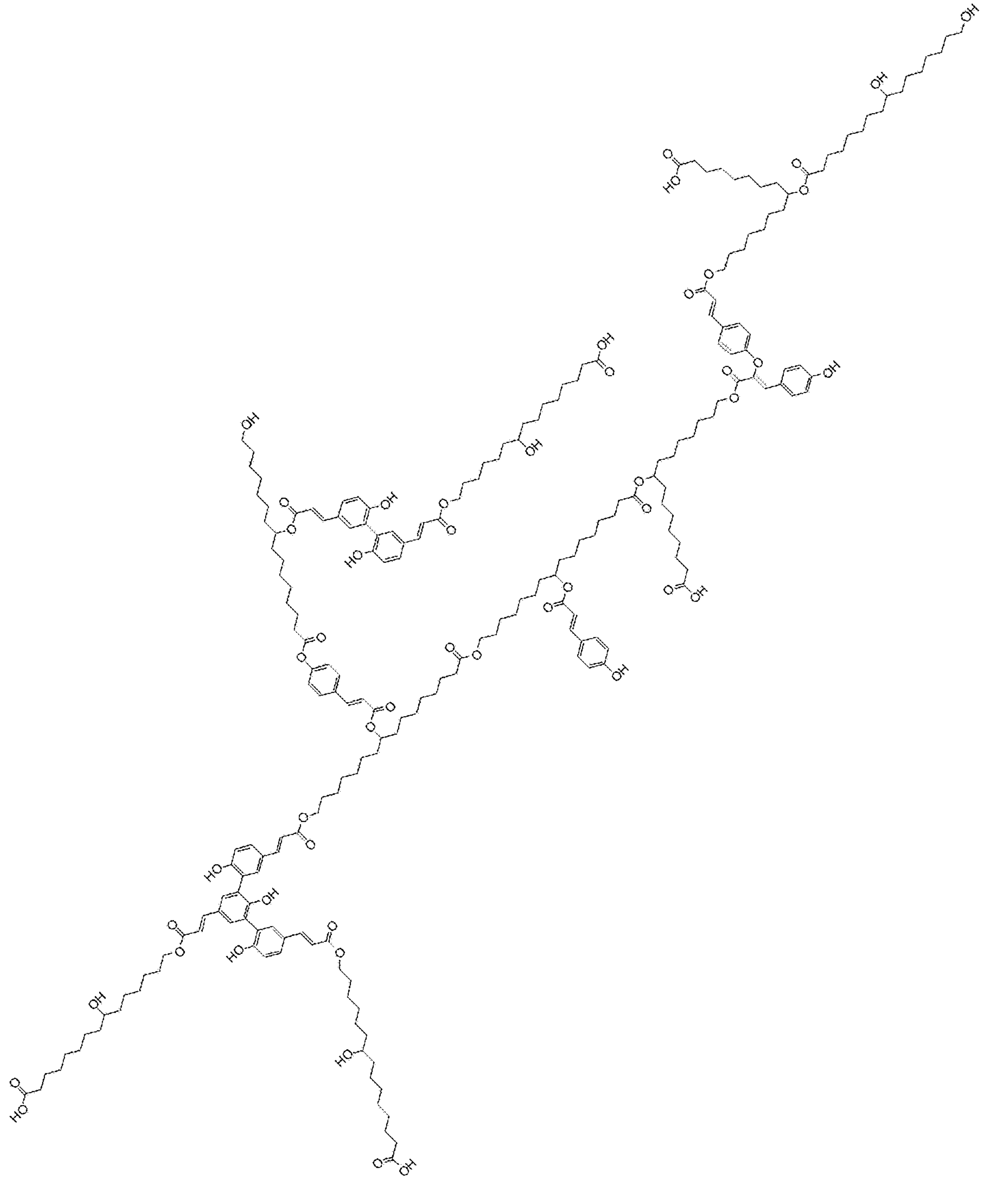
Figure 11:
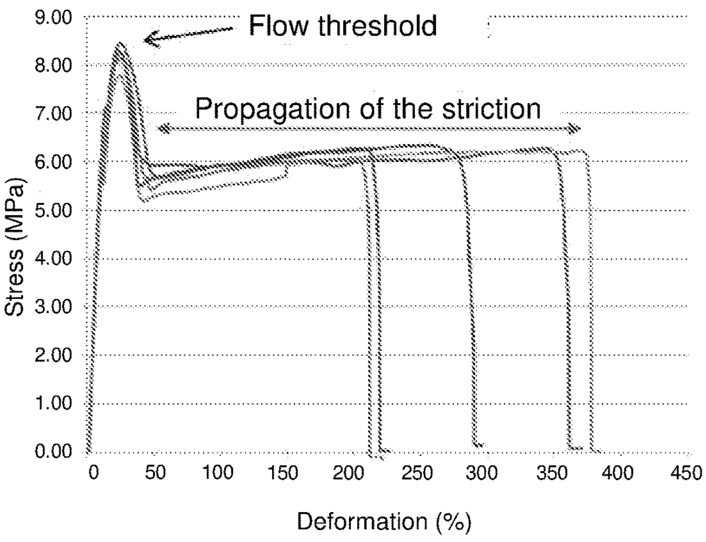

FIG. 11 shows the stress/deformation curves under tension at 20° C. for various test pieces of a polymer material according to the invention.

Figure 12:
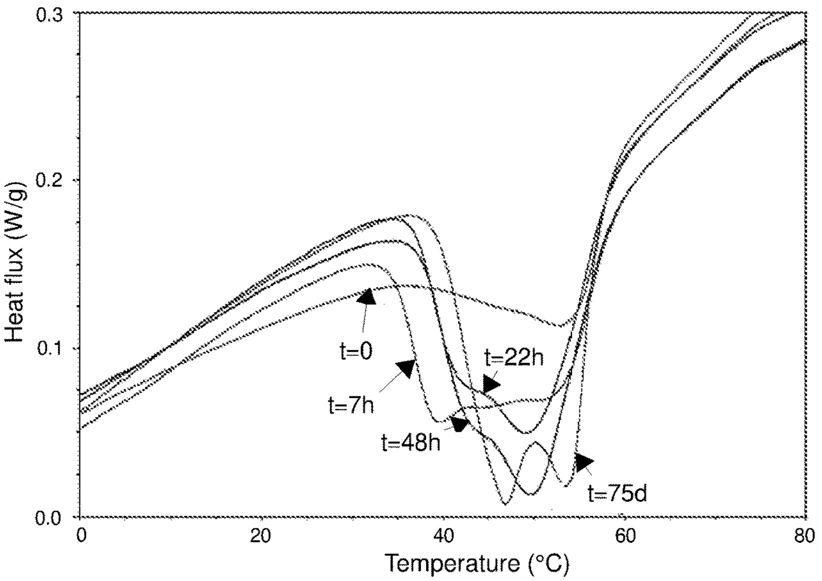

FIG. 12 shows a graph showing the heat flux, measured by differential enthalpy analysis, as a function of temperature, for various ageing times (0 h, 7 h, 22 h, 48 h, 75 days) of a polymer material according to the invention.

Figure 13:
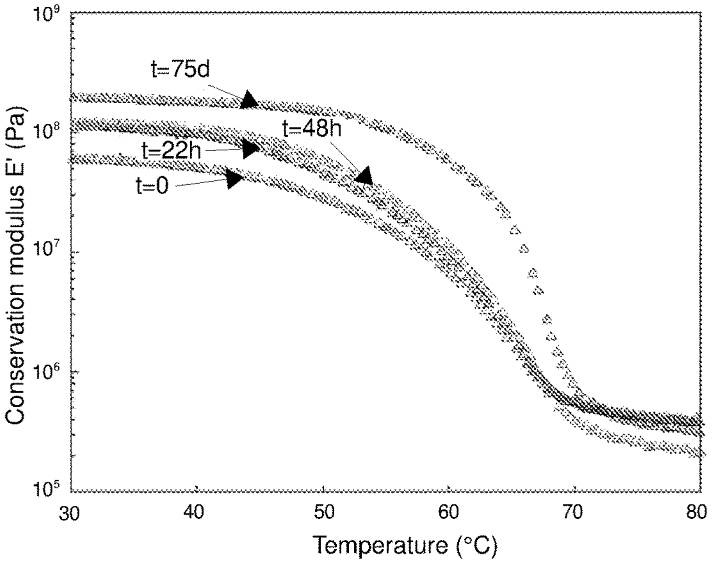

FIG. 13 shows a graph showing the conservation modulus, measured by dynamic mechanical analysis, as a function of temperature, for a polymer material according to the invention at various ageing times (0 h, 22 h, 48 h, 75 days).

Figure 14:
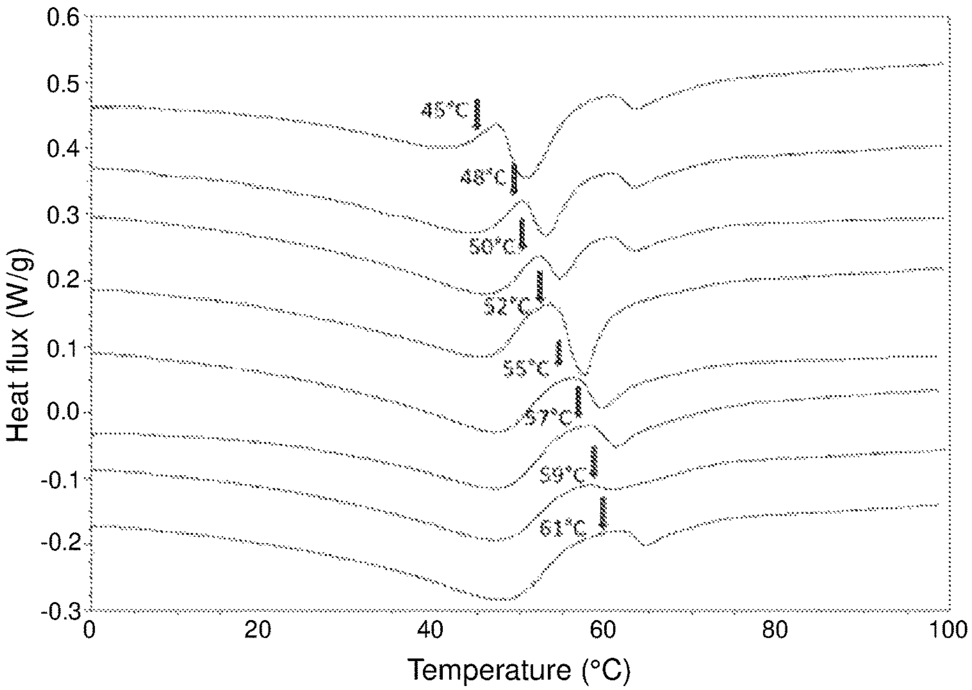

FIG. 14 shows thermograms obtained by scanning differential calorimetry analysis of a polymer material according to the invention after it has been subjected to heating for 5 min respectively at various temperatures between 45° C. and 61° C.

Figure 15:
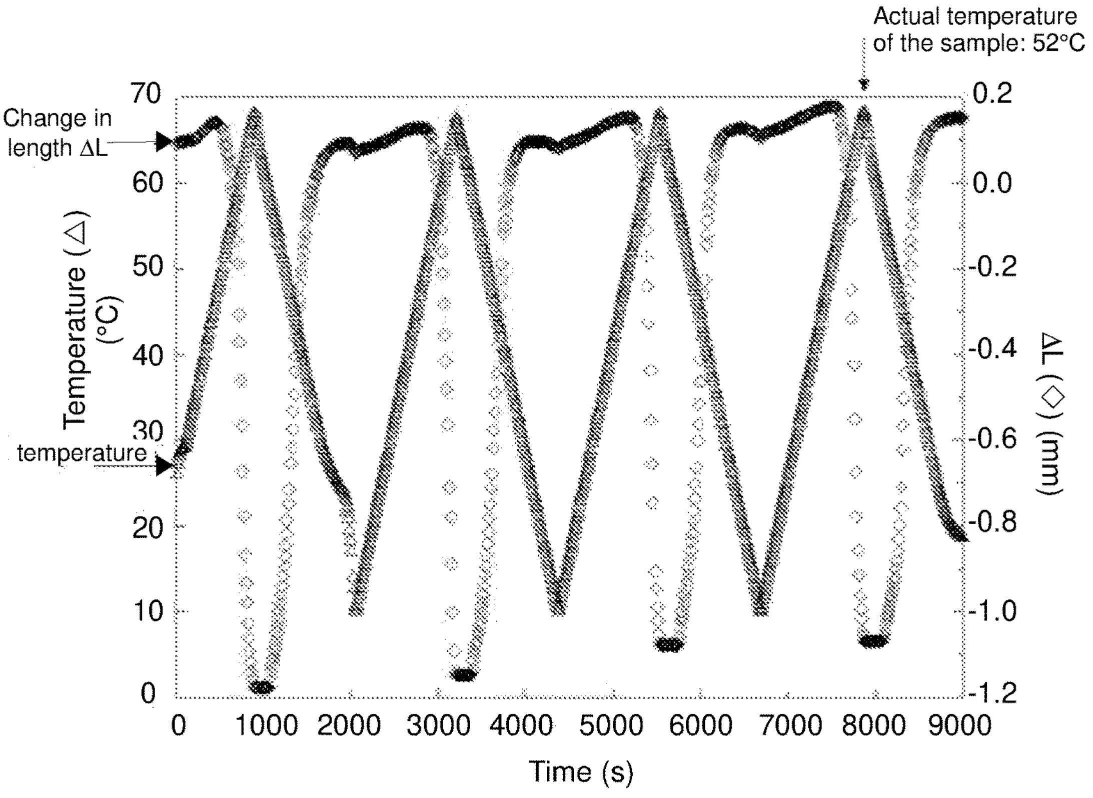

FIG. 15 shows a graph obtained by dynamic mechanical analysis implemented on a sample of polymer material according to the invention after it has been initially subjected to heating at a temperature above the melting points of its crystalline phases, under stretching, and then to cooling under this same stretching, the dynamic mechanical analysis comprising the exposure of the sample of the polymer material to a cyclic temperature variation and the variation in the length ($\Delta L$) of this sample being monitored over time.

A/Obtaining an Extract of Tomato Cutin E0

A method for extracting hydroxylated fatty acids from tomato cutin is implemented as follows.

Tomato skins are isolated by decantation from tomato draff. These skins are dried, ground and delipidized by reflux in a Soxhlet extractor by means of an acetone:ethanol mixture (1:1) for 2 days. They are next dehydrated.

200 g of tomato skins thus previously shredded and dehydrated are put in suspension in 1 L of a 5% potassium hydroxide solution KOH prepared in anhydrous ethanol. The mixture is heated at 50° C. for 16 hours. The suspension is next filtered under vacuum by passing through a size AO (160-250 μm) frit, the volume of ethanol is reduced by evaporation, and then the filtrate is diluted by water and acidified to pH 3-4 by means of a 37% solution of hydrochloric acid HCl. The suspension thus formed is centrifuged at 8000 rpm for 15 min at 20° C., and then the centrifugation pellet is recovered, washed with water and then dried under vacuum. 150 g of an oily extract mainly consisting of fatty acids (for more than 85% by weight) are thus obtained.

This extract, reddish-brown in color, is in the present description referred to as "E0".

B/Characterization of the Extract of Tomato Cutin E0

The purity of the monomers extracted from the tomato draff is evaluated by implementing a phase partitioning in chloroform-methanol-water (8/4/3, v/v); the lower phase containing the fatty acids (and the colorants) is collected, evaporated and weighed. This method gives an overall purity integrating the residual water, protein and polysaccharide contents. The hydrophobic molecules (fatty acids and phenolic compounds) content is 97.3±0.9%.

B.1/Analysis of the Fatty Acid Composition of the Extract

An analysis of the extract E0 by gas chromatography coupled to mass spectrometry GC-MS/FID, with respect to an external standard range of C17, shows that the fatty acid fraction of this oily extract includes a ω-hydroxylated fatty acid content of more than 90%. The mass centesimal composition of the fraction of the fatty acids of this oily extract thus obtained is indicated in table 1 below.

TABLE 1

| Constituent | Content in the extract (%) |
|---|---|
| Hexadecanoic acid | 2.04 |
| Linoleic acid | 0.46 |
| Oleic acid | 0.28 |
| Stearic acid | 0.05 |
| 16-hydroxyhexadecanoic acid | 3.6 |
| 1,16-hexadecanoic acid | 0.61 |
| 10,16-dihydroxyhexadecanoic acid | 89.66 |
| Hydroxyhexadecan-1,16-dioic acid | 2.12 |
| Dihydroxyoctanoic acid | 0.28 |

10,16-dihydroxyhexadecanoic acid is by far the majority constituent of this oily extract, wherein it represents almost 90% of the weight of the majority fraction.

B.2/Analysis of the Composition in Phenolic Compounds of the Extract

The total phenolic compounds composition of the extract E0 is determined by spectrophotometry using gallic acid as a standard and the method described in the publication of Cabone et al., 2011, *Food Chem*, 127, 493-500. The sample of tomato cutin monomers is dissolved in $EtOH/H_2O$ (70:30) at a concentration of 5 g/L. After adding 1 mL of water, and then 1 mL of Folin-Ciocalteu reagent (9001.0100, Merck), the reaction takes place for 3-5 minutes. After adding a 10% solution of $Na_2CO_3$ (1.06398.1000, Merck) and water qsp 20 mL, the samples are incubated for 1.5 hours at ambient temperature away from light. The absorbance is read at 760 nm by spectrophotometer (Shimadzu, UV-1800) against a blank (replacement of the sample by osmosed water in the preparation of the tube). The total phenolic compounds composition is expressed in mg/g (gallic acid equivalents per gram of fatty acid). The result is calculated via a gallic acid calibration curve made between the concentrations 0.015 g/L and g/L.

A quantity of total phenolic compounds equal to 44.622+/−2.23 mg equivalent of gallic acid per g of extract is thus determined, which is equivalent to 4.5% by weight with respect to the total weight of the extract.

C/Purification of the Extract of Tomato Cutin E0

Purification of the extract E0 is carried out by adsorption chromatography on amino-propyl silica column. A glass column (5×45 cm terminated at its base successively by a frit and a tap) is filled with 100 g of amino-propyl silica dispersed in 300 mL of chloroform-isopropanol 2:1 (v:v).

Protocol 1

11 g of the extract E0 diluted in 150 mL of chloroform-isopropanol 2:1 (v:v) mixture is deposited on the column. After adsorption of the fatty acids, a first elution is implemented with 1 L of this solvent. The fatty acids are next eluted by 1.5 L of a CHCl3-glacial acetic acid 98:2 (v:v) mixture. After evaporation of the solvents under vacuum, a yellow purified extract, called E1, is obtained.

Protocol 2

Protocol 1 is applied, except that, during the second elution, the first 200 mL is eliminated; the rest of the elution (1.3 L) is collected and evaporated under vacuum to obtain a very pale yellow purified extract, called E2, the degree of purification of which is greater than that of E1.

Another alternative for obtaining the extract E2 consists in recrystallizing the fatty acids contained in the extract E1 in chloroform at −20° C. For this, 5 g of extract E1 is dissolved in chloroform at a temperature of 55° C., and then placed at −20° C. for 12 hours. The precipitated (crystallized) fatty acids are next filtered on a Buchner funnel covered with Joseph paper and washed with chloroform at −20° C. The extract obtained is next dried under a hood at ambient temperature.

Protocol 3

The extract E1 obtained according to protocol 1 is subjected to an additional step of chromatography on amino-propyl silica gel implemented under the same conditions as described in protocol 2, except that: i) the column load of extract E1 is 8 g per 100 g of amino-propyl silica; ii) the first 150 mL of the second elution are eliminated by chloroform-glacial acetic acid 98:2 (v:v).

A white purified extract is obtained, called E3, the degree of purification of which is greater than that of E1 and E2.

Another alternative for obtaining the extract E3 is to implement a triple recrystallization of the extract E1 in chloroform at −20° C.

D/Characterization of the Partially Purified Extracts E1, E2 and E3

D.1/Analysis of the Composition in Phenolic Compounds of the Extracts

The residual phenolic compounds content is estimated according to the method described above in part B.2/using gallic acid standard ranges.

The following values are obtained:

extract E1: 7.525+/−0.28 mg equivalent of gallic acid per g of extract, which is equivalent to 0.7% by weight with respect to the total weight of the extract;

extract E3: 0.221+/−0.63 mg equivalent of gallic acid per g of extract, which is equivalent to approximately 0.02% by weight with respect to the total weight of the extract.

Extracts E1 and E2 have a phenolic compound content in accordance with the present invention, and can be used as such in a method for preparing a polymer material according to the invention. Extract E3 has a total phenolic compounds content less than the content recommended by the present invention.

D.2/Analysis by Fourier Transform Infrared Spectroscopy

The FTIR analysis (30 scans) is implemented at a resolution of 4 $cm^{-1}$ on a Nicolet *Magna* IR 550 spectrometer equipped with a mercury cadmium telluride detector under dry-airflow. The spectra are acquired in ATR mode on a diamond crystal with an angle of incidence of 45°. All the spectra are acquired between 4000 and 700 $cm^{-1}$.

The non-purified extract E0, and the extracts at different purification levels E1, E2 and E3, are analyzed by infrared spectroscopy. The spectra obtained are shown on FIG. 2. A spectrum typical of fatty acids is clearly observed thereon, for each of the 4 extracts. Furthermore, for the purified extracts E1, E2 and E3, the gradual disappearance of the bands at 2970, 1628, 1605, 1550, 1512, 835 $cm^{-1}$, indicated by arrows on the figure, which are present for the non-purified extract E0, is observed. This disappearance testifies to the disappearance of the phenolic units during purification.

D.3/Analysis by UV-Visible Spectroscopy

In order to determine the impact of the purification method on the composition in phenolic compounds of the extracts, a UV profile was measured from 200 to 600 nm at a concentration of 0.1 g/L of extracts in 96% ethanol.

The UV-visible spectroscopy implemented on the extracts E0, E1 and E2 shows the presence of species absorbing at 380, 288 and 225 nm, as observed on FIG. 3. In addition, it testifies to the elimination of compounds absorbing in the UV-visible, i.e., phenolic compounds, during the purification of the extract E0.

D.4/Identification of the Phenolic Compounds

The search for phenolic compounds is done by liquid chromatography coupled with tandem mass spectrometry (LC-MS-MS), for the non-purified extract E0 and the partially purified extract E1.

For this purpose, the samples are solubilized in an MeOH/$H_2O$/HCOOH (80/20/0,1, v/v/v) mixture and analyzed on a C18 and UV detection column at 280 nm (detection of polyphenols), 330 nm (detection of hydroxycinnamic acids) and 360 nm (detection of flavanols).

The results obtained are shown on FIG. 4.

The various peaks are identified as indicated in table 2 below.

TABLE 2

| Peak | Retention time (min) | Compound |
|---|---|---|
| 1 | 3.7 | 2-hydroxybenzoic acid |
| 2 | 4.7 | Benzoic acid |
| 3 | 5.8 | p-coumaric acid |
| 4 | 6.1 | cis-p-coumaric acid |
| 5 | 6.4 | Ferulic acid |
| 6 | 8 | Quinone form of coumaric acid |
| 7 | 10.4 | Myricetin |
| 8 | 10.9 | Naringenin |
| 9 | 12 | 2-methylcoumaric acid |
| 10 | 15.2 | Myricetin deoxyhexose |
| 11 | 17.2 | Quercetin rhamnoside |
| 12 | 17.3 | Quercetin 3-O-(6"-malonyl-glucoside) 7-O-glucoside |
| 13 | 17.6 | Quercetin deoxyhexose |
| 14 | 17.8 | Deoxyhexosyl-dihydrokaempferol |
| 15 | 18.1 | Quercetin 3-O-(6"-malonyl-glucoside) 7-O-glucoside |

Between the two extracts E0 and E1, quantitative differences are observed, but the composition in phenolic compounds is roughly comparable.

Two compounds are however not found in the extract E1: myricetin deoxyhexose (peak 10, retention time 15.2 min), and the quinone form of coumaric acid (peak 6, retention time 8 min). One of the isomers of quercetin 3-O-(6"-malonyl-glucoside) 7-O-glucoside (peak 15, retention time 18.1 min) is moreover present in a very small quantity in the extract E1.

E/Formation of Polymer Materials from the Extracts E0, E1, E2 and E3

For each extract the following protocol is applied.

The required quantity of extract is introduced into a stainless-steel mold, dimensions 4×4 cm, covered with Teflon. The whole is preheated an oven (Thermo Scientific FB65500) at 60° C. for 5 min.

No compound, in particular no catalyst or solvent, is introduced into the reaction medium, which consists only of the extract.

The mold containing this reaction medium thus formed is introduced into an oven at 60° C., and the reaction medium is homogenized by manual stirring by means of a spatula for 5 min. A desiccating agent (phosphorus oxide $P_2O_5$) is also introduced into the oven.

A temperature of 150° C. and a pressure of 400 mbar is next applied in the oven during an initial phase having a duration of 90 min. The copolymerization of the fatty acids and phenolic compounds contained in the extract occurs in the reaction medium, as well as a start of cross-linking of the polymer thus formed. The pressure in the oven is returned to atmospheric pressure at the end of this initial phase.

Heating is then continued, during the second phase of the heating step, for 22 hours at 150° C., at atmospheric pressure, to continue the cross-linking of the polymer.

At the end of this heating step, the mold is removed from the oven and cooled in an ice bath.

For the extracts E0, E1 and E2, a solid polymer material endowed with elastic deformation properties is removed therefrom.

For the extract E3, no cross-linked polyester material is obtained.

F/Characterization of the Polymer Materials

F.1/Determination of the Gel Time

During this initial phase, monitoring of the rheological behavior of the extracts as a function of time under isothermal conditions at 150° C. makes it possible to reveal the gelling of the polymer material after a certain reaction time. For this purpose, a rotational rheometer with a plane-plane geometry (diameter 20 mm, air gap of 0.5 mm) is used in dynamic mode (frequency of 1 Hz, deformation of 0.1%). At the start of the 150° C. isotherm, the loss modulus G" measured is higher than the conservation modulus G', because of the liquid behavior of the fatty acids. During the isothermal reaction, the two moduli increase, and then the modulus G' becomes higher than the modulus G", indicating the formation of a solid by gelling. As a first approximation, the gel time can be estimated by the time at the crossing point of the moduli G'=G".

The following gel times are obtained: 2 hours 15 minutes for the extract E0, 7 hours 30 minutes for the extract E1, 8 hours 50 minutes for the extract E2. This demonstrates the formation of a three-dimensional lattice in the polymer materials obtained from these extracts.

F.2/Degree of Cross-Linking and Architecture of the Polymer Materials

The polymer materials obtained from each of the extracts E0, E1 and E2 are analyzed by infrared spectroscopy, as indicated above for these extracts.

The spectra obtained are shown on FIG. 5. On all the spectra, the presence of a band characteristic of a carbonyl at 1730 $cm^{-1}$ and the absence of a band characteristic of an acid at 1705 $cm^{-1}$ testify to the formation of a polyester for all the extracts, the phenolic compounds being bound to the fatty acids by ester bonds.

In order to determine the architecture of the polymer material, the method described in the publication of Philippe et al., Plant Physiology, 2016, 170, 807-820, is applied for each of the polymer materials obtained from the extracts E0, E1 and E2. For this purpose, 5 mg of polymer material is mixed in a stoppered glass tube for 24 hours with 50 mg of 2-benzyloxy-1-methylpyridinium triflate (Sigma-Aldrich) and 6 mg of magnesium oxide in 1 ml of trifluorotoluene at 90° C. The polymer material is next rinsed with dichloromethane and dried. The marked polymer material is then depolymerized using 0.5 M sodium methanolate. This depolymerization is implemented for 16 hours at 60° C. An aliquot of this fraction is taken and injected into gas chromatography coupled to mass spectrometry (GC-MS) after silylation. In this way, for each polymer material obtained, there are determined the relative proportions by weight of the fragments corresponding to: 10,16-dihydroxyhexadecanoic acid esterified at its two hydroxyl functions; 10,16-dihydroxyhexadecanoic acid esterified solely at its secondary hydroxyl function; 10,16-dihydroxyhexadecanoic acid esterified solely at its primary hydroxyl function.

The results obtained are shown on FIG. 6. It is observed that the purification has an impact on the cross-linking diagram: the more the fatty acids were purified before the polymerization, the less cross-linked is the polymer material produced, the number of free hydroxyl groups of the fatty acids in the polyester increasing with the degree of purification of the extracts.

F.3/Crystalline Organization of the Polymer Materials

An analysis by X-ray crystallography (DRX) is implemented on the polymer materials obtained from the extracts E0, E1 and E2, at 25° C., by means of a Bruker D8 X-ray diffractometer equipped with a Vantec 500 detector. The X-radiation, Cu Kα1(=0.15406 nm), produced in a sealed copper tube at 40 kV and 40 mA, is selected and parallelized by means of Goebel mirrors. The distance between the sample and the detector is 10 cm and the Bragg angles from 3 to 70 (° 2θ).

The diffractograms obtained are shown on FIG. 7. It is observed thereon that, contrary to the polymer materials produced from the non-purified extract E0, the materials obtained from the purified extracts E1 and E2 have a single peak, which indicates a crystalline character. This peak, at 4.15-4.2 Å, is typical of an organization in hexagonal phase for the fatty acid chains.

F.4/Thermomechanical Properties

A dynamic mechanical analysis of the polymer materials obtained from the extracts E0, E1, E2 and E3 is carried out by dynamic mechanical analysis (DMA), by means of a Rheometric Scientific MK3E device for measuring the conservation modulus as a function of temperature. Samples of each polymer material of thickness 1 mm, height 15 mm, width 4 mm, are analyzed from −50° C. to 100° C., with a temperature rise rate of 3° C./min, with an oscillation frequency of 1 Hz, a deformation of 0.1% and a preload of 0.5 N.

The results obtained are shown on FIG. 8, which shows that these materials have drops in conservation moduli corresponding to the melting of the crystals, the degree of purification of the extracts modulating the melting point of the materials. Thus, the more the extracts are purified, and the less phenolic compounds they contain, the higher the melting point of the polymer materials that come therefrom. In addition, the conservation modulus at the rubbery plateau, at around 90° C., also varies with the degree of purity of the extracts: the more purified the extracts, the more the polymer materials formed have a low conservation modulus at the rubbery plateau.

The results obtained make it possible to propose, for the polymer materials obtained from the partially purified extracts E1 and E2, the structural diagram shown on FIG. 9, corresponding to a semicrystalline structure comprising stacks of crystalline phases of the hexagonal type (stacks of linear polyesters). Such a diagram is not applicable to the polymer materials obtained from the extracts E0 and E3 comprising respectively an excessively large, or insufficient, quantity of phenolic units, and therefore devoid, respectively, of the degree of crystallinity or of the elastomeric behavior necessary for obtaining shape memory properties.

G/Study of the Thermomechanical Behavior of the Polymer Materials at Various Temperatures G.1/Experiment 1—Deformation at a Temperature Higher than the Melting Point of the Crystalline Phase of the Material A sample of polymer material E1, in the form of a stick with a square cross-section (4×1 $mm^2$) and a length of 2 cm is used.

The melting point of its crystalline phases is measured by differential enthalpy analysis (DEA, or DSC, standing for differential scanning calorimetry) comprising a temperature scan of a sample of polymer material, from a temperature of −50° C. a temperature of 80° C. with a temperature rise ramp of 3° C./min. This scan is followed by a temperature descent at 3° C./min and then a second rising scan, under the same conditions. This analysis is implemented on a quantity of polymer material of 2 mg, placed in a hermetic aluminum capsule.

In this way a melting point of between 40 and 50° C. is determined.

This sample is subjected to the following operations. The sample is shown at each step on FIG. 10.

On this figure, the sample can be seen at a/in its permanent form. It is next immersed in water at a temperature higher than 60° C. for 5 seconds, and then removed from the bath and stretched as it cools. It then has an elongated shape compared with its initial state, shown at b/on the figure, this temporary shape being durably fixed. The sample is next once again immersed in water at a temperature higher than 60° C., and then removed from the bath, without any stress being exerted on it. It is then observed, as shown at c/on the figure, that it has regained its initial permanent shape.

This behavior is characteristic of shape memory materials. The same behavior is observed for the polymer material obtained from the partially purified extract E2.

This behavior is on the other hand not found for the polymer materials obtained from the non-purified extract E0, and from the completely purified extract E3. The sample obtained from E0 immediately resumes its shape after having been immersed in water and then stretched during cooling, and this whatever the temperature of the water. The sample obtained from E3, once deformed, never resumes its initial shape, whatever the temperature to which it is then subjected.

G.2/Experiment 2—Deformation at a Temperature Lower than the Melting Point of the Crystalline Phase of the Material The polymer material E2 is used. The melting point of its crystalline phases, measured by differential enthalpy analysis as described above, is between 40 and 50° C.

Various test pieces of this material are subjected to a tensile test at 20° C. on an MTS Synergie 100 apparatus (MTS Systems Corporation). The tests are conducted at a speed of 10 mm/min.

It is observed that, at the measurement temperature of 20° C., which is below the melting point of the crystalline phases of the polymer material, for deformations of less than approximately 20%, the behavior of the material is of the elastic type. The stress increases linearly with the deformation until it reaches a flow threshold at 8 MPa for approximately 20% of uniaxial deformation. Beyond 20% of uniaxial deformation, the behavior of the material becomes plastic, a striction phenomenon is observed and the deformation becomes permanent. To program the polymer material according to the invention, it is therefore necessary to deform it of a minimum of 20% to obtain plastic deformation.

The polymer material according to the invention therefore has a shape memory capability: deformed plastically when cold to obtain a programmed temporary shape, and then heated, it regains its initial shape. The same behavior is observed for the polymer material obtained from the partially purified extract E1. This behavior is not found for the polymer materials obtained from the non-purified extract E0 and the completely purified extract E3.

H/Study of Ageing on the Thermal Properties of a Polymer Material According to the Invention The effect of ageing on the thermal properties of the polymer material obtained from the extract E1 is measured by differential enthalpy analysis (DEA, or DSC, standing for differential scanning calorimetry) comprising a temperature scan of a sample of polymer material, from a temperature of −50° C. to a temperature of with a temperature rise ramp of 3° C./min. This scan is followed by a temperature descent at 3° C./min and then a second rising scan, under the same conditions. This analysis is preferably implemented on a quantity of polymer material of the order of 2 mg, placed in a hermetic aluminum capsule. The effect of ageing is cancelled out during the first heating at 80° C. The thermogram obtained during the second heating corresponds to the behavior of the polymer material without ageing effect or "rejuvenated". The same sample is used for the analysis at various ageing times, wherein the time 0 is that of the preceding analysis.

The curves obtained for ageing times of 0 hours, 7 hours, 22 hours, 48 hours and 75 days, are shown on FIG. 12. It is observed thereon that the temperature of start of melting, referred to as $T_{onset}$, determined at the intersection of the baseline and of the fall of the signal at the start of the peak, increases from 34.7° C. for 22 hours of ageing to 39.5° C. for 75 days. The melting enthalpy for its part increases from 21 to 51 Joules/gram when the ageing time increases from to 75 days, which means that the polymer material crystallizes over time.

The effect of ageing on the mechanical properties of the polymer material is studied by dynamic mechanical analysis (DMA), by means of a Rheometric Scientific MK3E device. Samples of thickness 1 mm, height 15 mm, width 4 mm, are analyzed from 30° C. to 80° C., with a temperature rise rate of 3° C./min, with an oscillation frequency of 1 Hz, a deformation of 0.1% and a preload of 0.5 N. The conservation modulus E' is measured on the same sample at various ageing times. It is observed in particular on FIG. 13 that the conservation modulus at increases from 59 to 193 MPa when the sample of polymer material ages from 0 to 75 days.

I/Demonstration of the Reversibility of the Shape Memory Property of a Polymer Material According to the Invention Samples of the polymer material obtained from the extract E2 are first of all subjected to analysis by DSC, after heat treatment for 5 min respectively at various temperatures between 45° C. and 61° C. (more precisely at 45° C., 48° C., 52° C., 55° C., 57° C., 59° C. and 61° C.). The thermograms obtained are shown on FIG. 14.

It is determined that the two melting peaks of the two crystalline forms of this polymer material are best separated for the heating temperature of 52° C., which is thus fixed as the temperature for triggering shape reversibility.

The mechanical relaxation as a function of temperature of the polymer material is determined by dynamic mechanical analysis (DMA), by means of a Rheometric Scientific MK3E device also allowing the measurement of the conservation modulus at the rubbery plateau.

A sample of the polymer material with a thickness of the order of 0.5 to 1 mm, height 10 mm, width 4 mm, is stretched manually by 90% (19 mm of final length) at 70° C. (temperature higher than the melting points of the crystalline forms of the polymer material, for which, on the thermograms obtained by DSC, the heat flux curve has returned to the base level), and then cooled under this same stress. The stress is next relaxed when the sample is at ambient temperature. The sample is next placed in the analysis device and the variations in its length (as well as the moduli) are measured when it is subjected to a cyclic variation in temperature between 10° C. and 68° C. (set speed, corresponding to a real temperature of the sample of 52° C.), with a temperature rise or descent rate of 3° C./min, an oscillation frequency of 1 Hz, a deformation of 0.1% and a preload of 0.5 N.

The results obtained are shown on FIG. 15. The reversibility of shape of the sample as a function of temperature appears clearly therein, for each of the heating cycles applied.

The invention claimed is:

1. A method for preparing a polyester polymer material, comprising successively, the steps of:

preparing a reaction medium comprising a mixture of:

at least one monomer selected from w-hydroxylated fatty acids, or esters of a w-hydroxylated fatty acid and an alcohol having a linear or branched, saturated or unsaturated, optionally substituted, aliphatic chain, said aliphatic chain comprising from 1 to 18 carbon atoms; and at least one phenolic compound, the total phenolic compound(s) content, determined by spectrophotometric analysis after reaction with a Folin-Ciocalteu reagent, with respect to a standard range of gallic acid, lying in a range of values from 0.3 to 42 mg equivalent of gallic acid per gram of said mixture, and heating this reaction medium to carry out the polymerization of said monomer and of said phenolic compound and cross-linking of the polymer thus formed.

2. The method according to claim 1, wherein said reaction medium is free from catalyst.

3. The method according to claim 1, wherein at least an initial phase of the heating step is implemented under reduced pressure.

4. The method according to claim 3, wherein at least an initial phase of the heating step is implemented at a pressure between 0 and 900 mbar.

5. The method according to claim 1, wherein said heating step is implemented in a temperature range between 120 and 200° C., for a period of at least 4 hours.

6. The method according to claim 1, wherein said mixture contains at least one phenolic compound selected from the group consisting of hydroxybenzoic acids, hydroxycinnamic acids and flavonoids, and any combination of such phenolic compounds.

7. The method according to claim 1, wherein said mixture contains at least p-coumaric acid and/or naringenin.

8. The method according to claim 1, wherein said monomer is a dihydroxylated fatty acid or an ester of a dihydroxylated fatty acid and an alcohol having a linear or branched, saturated or unsaturated, optionally substituted, aliphatic chain, comprising from 1 to 18 carbon atoms.

9. The method according to claim 1, wherein said mixture is obtained by depolymerization of cutin, so as to obtain a monomers extract, recovery of the monomers extract obtained and purification of said monomers extract to partially eliminate the phenolic compounds contained in said monomers extract, so as to obtain for said monomers extract a phenolic compound(s) content lying in said range of values.

10. A polyester polymer material obtained by the method according to claim 1, comprising as constituent monomer units at least one w-hydroxylated fatty acid and at least one phenolic compound;

having a semicrystalline structure comprising stacks of crystalline phases of the hexagonal type; and containing a quantity of 0.03 to 4.2% by weight of phenolic compound(s) units, with respect to the total weight of said polymer material, this quantity being determined by quantitative analysis of the total content of phenolic compound(s) in the mixture used for preparing said polymer material, by spectrophotometric analysis after reaction with a Folin-Ciocalteu reagent, with respect to a standard range of gallic acid, this content lying in a range of values from 0.3 to 42 mg equivalent of gallic acid per gram of mixture.

11. The polyester polymer material according to claim 10, wherein the melting point of said crystalline phases is above 30° C.

12. The method according to claim 4, wherein the pressure is between 400 and 800 mbar.

13. The method according to claim 8, wherein said monomer is 10,16-dihydroxyhexadecanoic acid or the methyl or ethyl ester thereof.

14. The method according to claim 9, wherein said cutin is tomato cutin.

15. The polyester polymer material according to claim 11, wherein the melting point of said crystalline phases is between 3° and 70° C.

* * * * *